United States Patent [19]

Johnsen

[11] Patent Number: 4,997,232
[45] Date of Patent: Mar. 5, 1991

[54] SHOCK ABSORBING BICYCLE SEAT MOUNTING POST

[76] Inventor: Thore Johnsen, 2976 Islip Ct., Wantagh, N.Y. 11793

[21] Appl. No.: 447,821

[22] Filed: Dec. 8, 1989

[51] Int. Cl.⁵ ............................................. B62J 1/02
[52] U.S. Cl. .................................... 297/209; 248/601
[58] Field of Search ............... 248/599, 600, 601, 602, 248/622, 623, 162.1; 297/195, 209; 280/283

[56] References Cited

U.S. PATENT DOCUMENTS

| | | | |
|---|---|---|---|
| 564,142 | 7/1896 | Beardsley | 280/283 |
| 640,483 | 1/1900 | McKenzie | 248/601 |
| 2,107,561 | 2/1938 | Brandt | 297/209 |
| 2,162,399 | 6/1939 | Hayes | 248/601 |
| 3,466,086 | 9/1969 | James | 297/209 |
| 4,182,508 | 1/1980 | Kallai | 297/209 |
| 4,456,295 | 6/1984 | Francu | 297/209 |
| 4,736,983 | 4/1988 | Furbee | 248/600 |

FOREIGN PATENT DOCUMENTS

| | | | |
|---|---|---|---|
| 870860 | 3/1942 | France | 280/283 |
| 560679 | 4/1944 | United Kingdom | 248/601 |

Primary Examiner—Ramon O. Ramirez
Assistant Examiner—Robert A. Olson
Attorney, Agent, or Firm—Ladas & Parry

[57] ABSTRACT

A shock absorbing bicycle seat mounting post is provided and is mounted upon a hollow tubular socket member havng a binder clamp of a frame of a bicycle. The shock absorber will effectively absorb shocks which are carried through the frame when the wheels encounter obstacles and holes when traveling along the ground. In a modification the shock absorbing bicycle seat mounting post will also allow the bicycle seat assembly to rotate thereabout for additional adjustment.

13 Claims, 1 Drawing Sheet

SHOCK ABSORBING BICYCLE SEAT MOUNTING POST

BACKGROUND OF THE INVENTION

1. Field of the Invention

The instant invention relates generally to bicycle seats and more specifically it relates to a shock absorbing bicycle seat mounting post.

2. Description of the Prior Art

Numerous bicycle seats have been provided in prior art that are adapted to include spring biased support structures carried on bicycles. For example, U.S. Pat. Nos. 3,466,086 to James et al; 4,182,508 to Kallai et al and 4,456,295 to Francu all are illustrative of such prior art. While these units may be suitable for the particular purpose to which they address, they would not be as suitable for the purposes of the present invention as heretofore described.

SUMMARY OF THE INVENTION

A primary object of the present invention is to provide a shock absorbing bicycle seat mounting post that will overcome the shortcomings of the prior art devices.

Another object is to provide a shock absorbing bicycle seat mounting postthat can be installed on the frame of a bicycle so that it will effectively absorb shocks which are carried through the frame when the wheels encounter obstacles and holes when traveling along the ground.

An additional object is to provide a shock absorbing bicycle seat mounting post that will not only absorb the shocks but will also allow the bicycle seat assembly to rotate thereabout for additional adjustment.

A further object is to provide a shock absorbing bicycle seat mounting post that is simple and easy to use.

A still further object is to provide a shock absorber bicycle seat that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
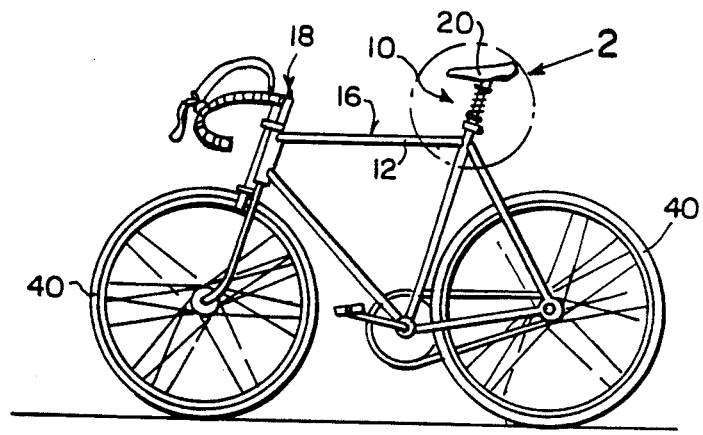
FIG. 1 is a side elevational view of a conventional bicycle equipped with a shock absorbing bicycle seat mounting post in accordance with the instant invention.
Figure 2:
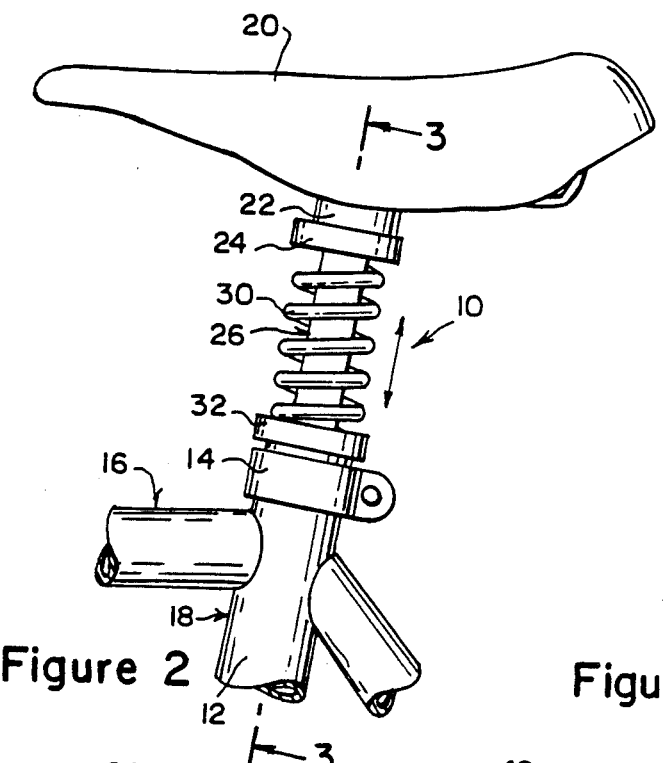
FIG. 2 is an enlarged side elevational view of the shock absorbing bicycle seat mounting post installed on the bicycle frame as indicated by arrow 2 in FIG. 1.
Figure 3:
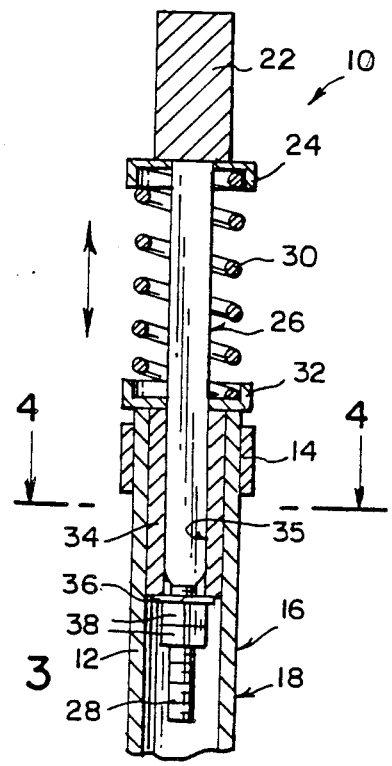
FIG. 3 is a cross sectional view taken along line 3—3 in FIG. 2, showing the internal structure thereof.

Turning now descriptively to the drawings, in which similar reference characters denote similar elements throughout the several views, FIG. 1 through 3 illustrate a shock absorbing bicycle seat mounting post 10 installed upon a hollow tubular socket member 12 having a binder clamp 14 of a frame 16 of a bicycle 18. The shock abosrbing bicycle seat mounting post 10 contains a bicycle seat assembly 20 for supporting a person (not shown) riding the bicycle 18. A mounting structure 22 is attached to the bicycle seat assembly 20 and a first collar member 24 is affixed to lower end of the mounting structure 22.

An elongated shaft 26 is affixed at upper end to the first collar member and extends downwardly therefrom. A threaded rod 28 is affixed axially to distal end of the shaft 26. A coil compression spring 30 is carried on the shaft 26 with upper end to bear against the first collar member, while a second collar member 32 is to bear against lower end of the spring 30.

A sleeve 34 is affixed at upper end to the second collar member 32 and has a bore 35 sized to receive the shaft 26 therethrough. A lock washer 36 is carried on the rod 28 to bear against the bottom of the sleeve 34. A pair of nuts 38 are threaded onto the rod 28 to bear against lower end of the spring 30. The sleeve 34 can be inserted into the hollow tubular socket member 12 and retained therein with the binder clamp 14. The shock absorbing bicycle seat mounting post 10 will effectively absorb shocks which are carried through the frame 16 when wheels 40 of the bicycle 18 encounter obstacles and holes when traveling along the ground.

Figure 4:
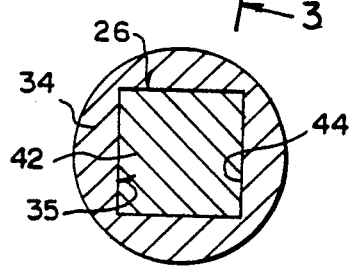
FIG. 4 is a cross sectional view taken along line 4—4 in FIG. 3, showing a square shaped shaft and corresponding sleeve.

As shown in FIG. 4, the shaft 26 is square shaped in cross section 42 and the bore 35 in the sleeve 34 is square shaped in cross section 44 so that the shaft 26 will not rotate within the sleeve 34, but will still be able to slide up and down.

Figure 5:
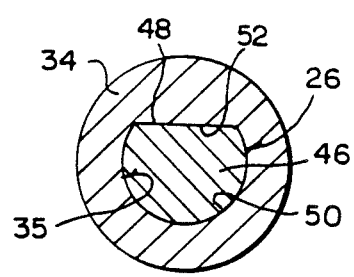
FIG. 5 is a cross sectional view similar to FIG. 4, showing a circular shaped shaft with a flat on one side and corresponding sleeve.

As shown in FIG. 5, the shaft 26 is circular shaped in cross section 46 with a flat 48 on one side and the bore 35 in the sleeve 34 is circular shaped in cross section 50 with a flat 52 on one side so that the shaft 26 will not rotate within the sleeve 34, but will still be able to slide up and down.

Figure 6:
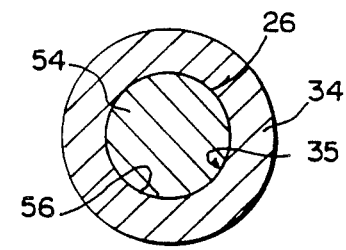
FIG. 6 is a cross sectional view similar to FIG. 4, showing a circular shaped shaft and corresponding sleeve so that the shaft with bicycle seat can rotate about the sleeve.

As shown in FIG. 6, the shaft 26 is circular shaped in cross section 54 and the bore 35 in the sleeve 34 is circular shaped in cross section 56 so that the shaft 26 will rotate within the sleeve 34 to cause the bicycle seat assembly 20 to be pivotably adjustable about the hollow tubular socket member 12.

LIST OF REFERENCE NUMBERS 10 shock absorbing bicycle seat mounting post
12 hollow tubular socket member
14 binder clamp
16 frame
18 bicycle
20 bicycle seat assembly
22 mounting structure
24 first collar member
26 elongated shaft
28 threaded rod
30 coil compression spring
32 second collar member
34 sleeve 35 bore in 34
36 lock washer
38 nut
40 wheel of 18
42 square shaped cross section of 26
44 square shaped cross section of 35
46 circular shaped cross section of 26
48 flat on 46
50 circular shaped cross section of 35
52 flat on 50
54 circular shaped cross section of 26
56 circular shaped cross section of 35

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modification, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A shock absorbing bicycle seat mounting post for placement within a tube of a bicycle frame for use with a bicycle seat assembly having a bicycle seat and a bicycle seat clamp, said mounting post comprising:
   a. an elongated shaft of substantially uniform cross section throughout its length, having an upper end and a lower end;
   b. a first collar member being affixed near the upper end of said elongated shaft, said first collar member having a portion extending beyond a circumference of the elongated shaft;
   c. a mounting structure having an upper end and a lower end, the lower end of said mounting structure being affixed near the first collar member, axially opposite the elongated shaft, wherein the mounting structure is clamped by the bicycle seat clamp of the bicycle seat assembly;
   d. a threaded rod axially affixed to the lower end of the shaft;
   e. a compression spring having an upper end and a lower end, said compression spring being positioned coaxially with the elongated shaft, the upper end of the compression spring bearing against the portion of first collar member extending beyond the circumference of the elongated shaft;
   f. a sleeve having a bore of substantially uniform cross section throughout its length corresponding to the cross section of the shaft, said elongated shaft being slideably received within said bore, said sleeve having an upper end and a lower end;
   g. a second collar member having an upper surface and a lower surface, said second collar member affixed at its lower surface to the upper end of the sleeve, said second collar member having a portion extending beyond the circumference of the sleeve, wherein the lower end of the compression spring bears against the upper surface of the second collar member;
   h. at least one nut threaded onto the threaded rod and engaging with the lower end of the sleeve so as to cause the elongated shaft to be drawn into the sleeve and thereby put tension on the compression spring by causing the compression spring to bear against the extending portions of the first and second collar members, whereby when the shock absorbing bicycle mounting post is installed in said tube of said bicycle frame, the shock absorbing bicycle seat post can absorb shocks which are carried through the bicycle frame when wheels of the bicycle encounter obstacles and holes when the bicycle travels on an uneven road surface.

2. A shock absorbing bicycle seat mounting post as recited in claim 1, wherein said shaft has a square shaped cross section throughout its length and said bore in said sleeve has a slightly larger square shaped cross section throughout its length so that said shaft will not rotate within said sleeve but will still be able to slide up and down.

3. A shock absorbing bicycle seat mounting post as recited in claim 1, wherein said shaft has a cross section throughout its length of a circle with a flat on one side and wherein said bore in said sleeve has a slightly larger cross section throughout its length of a circle with a flat on one side so that said shaft will not rotate within said sleeve, but will still be able to slide up and down.

4. A shock absorbing bicycle seat mounting post as recited in claim 1, wherein said shaft has a circular shaped cross section throughout its length and said bore in said sleeve has a slightly larger circular shaped cross section throughout its length so that said shaft will rotate within said sleeve to cause said bicycle seat assembly to be pivotably adjustable within the hollow top tube, and still allow the shaft to slide in and out.

5. A shock absorbing bicycle seat mounting post as recited in claim 1, wherein a washer is carried on the threaded rod to bear against the lower end of the sleeve.

6. A shock absorbing bicycle seat mounting post as recited in claim 1, wherein two nuts are threaded onto the threaded rod and can be tightened against each other at any position along the threaded rod to adjust the tension of the compression spring.

7. A shock absorbing bicycle seat mounting post as recited in claim 1, wherein said shaft has a cross section throughout its length having four or more sides and said bore in said sleeve has a bore of substantially uniform cross section throughout its length corresponding to the cross section of said elongated shaft so that said elongated shaft will not rotate within said sleeve but will still be able to slide up and down.

8. A shock absorbing bicycle seat mounting post for placement within a tube of a bicycle frame for use with a bicycle seat assembly having a bicycle seat and a bicycle seat clamp, said mounting post comprising:
   a. an elongated shaft of substantially uniform cross section throughout its length, having an upper end and a lower end;
   b. a first collar member being affixed near the upper end of said elongated shaft, said first collar member having a portion extending beyond a circumference of the elongated shaft;
   c. a mounting structure having an upper end and a lower end, the lower end of said mounting structure being affixed near the first collar member, axially opposite the elongated shaft, wherein the mounting structure is clamped by the bicycle seat clamp of the bicycle seat assembly;

d. a compression spring having an upper end and a lower end, said compression spring being positioned coaxially with the elongated shaft, the upper end of the compression spring bearing against the portion of first collar member extending beyond the circumference of the elongated shaft;

e. a sleeve having a constant cross section throughout its length, said sleeve having a bore corresponding to the cross section of the elongated shaft, said elongated shaft being slideably received within said bore, said sleeve having an upper end and a lower end, said sleeve having an outer diameter being sized to be slidable within said tube of the bicycle frame.

f. a second collar member having an upper surface and a lower surface, said second collar member affixed at its lower surface to the upper end of the sleeve, said second collar member having a portion extending beyond the circumference of the sleeve, wherein the lower end of the compression spring bears against the upper surface of the second collar member;

g. a threaded rod axially affixed to the lower end of the shaft; and h. at least one nut threaded onto the threaded rod and engaging with the lower end of the sleeve so as to cause the elongated shaft to be drawn into the sleeve and thereby put tension on the compression spring by causing the compression spring to bear against the extending portions of the first and second collar members, said threaded rod being sufficiently long so that said nut may be positioned at various positions on the threaded rod to adjust tension on the compression spring, whereby when the shock absorbing bicycle mounting post is installed in said tube of said bicycle frame, the shock absorbing bicycle seat post can absorb shocks which are carried through the bicycle frame when wheels of the bicycle encounter obstacles and holes when the bicycle travels on an uneven road surface.

9. A shock absorbing bicycle seat mounting post as recited in claim 8, wherein said shaft has a square shaped cross section throughout its length and said bore in said sleeve has a slightly larger square shaped cross section throughout its length so that said shaft will not rotate within said sleeve but will still be able to slide up and down.

10. A shock absorbing bicycle seat mounting post as recited in claim 8, wherein said shaft has a cross section throughout its length of a circle with a flat on one side and wherein said bore in said sleeve has a slightly larger cross section throughout its length of a circle with a flat on one side so that said shaft will not rotate within said sleeve, but will still be able to slide up and down.

11. A shock absorbing bicycle seat mounting post as recited in claim 8, wherein a washer is carried on the threaded rod to bear against the lower end of the sleeve.

12. A shock absorbing bicycle seat mounting post as recited in claim 8, wherein two nuts are threaded onto the threaded rod and can be tightened against each other at any position along the threaded rod to adjust the tension of the compression spring.

13. A shock absorbing bicycle seat mounting post as recited in claim 8, wherein said shaft has a cross section throughout its length having four or more sides and said bore in said sleeve has a bore of substantially uniform cross section throughout its length corresponding to the cross section of said elongated shaft so that said elongated shaft will not rotate within said sleeve but will still be able to slide up and down.

* * * * *